(12) United States Patent
Parmar et al.

(10) Patent No.: US 7,072,958 B2
(45) Date of Patent: Jul. 4, 2006

(54) IDENTIFYING NETWORK MANAGEMENT POLICIES

(75) Inventors: Pankaj N. Parmar, Beaverton, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 09/919,059

(22) Filed: Jul. 30, 2001

(65) Prior Publication Data
US 2003/0023711 A1    Jan. 30, 2003

(51) Int. Cl.
*G06F 15/173* (2006.01)

(52) U.S. Cl. .................................. 709/223; 709/220

(58) Field of Classification Search .................. None
See application file for complete search history.

(56) References Cited

U.S. PATENT DOCUMENTS

| 6,157,955 | A | 12/2000 | Narad et al. | |
| 6,301,613 | B1 | 10/2001 | Ahlstrom et al. | |
| 6,778,534 | B1 * | 8/2004 | Tal et al. | 370/392 |

FOREIGN PATENT DOCUMENTS

| WO | WO 99/67931 | 12/1999 |
| WO | WO 00/78004 | 12/2000 |
| WO | WO 01/19031 | 3/2001 |

OTHER PUBLICATIONS http://www.networkcomputing.com/1024/1024f1side2.html, "Policy-Based Network Management," Nov. 29, 1999.

* cited by examiner

*Primary Examiner*—John B. Walsh
(74) *Attorney, Agent, or Firm*—Fish & Richardson P.C.

(57) ABSTRACT

A policy based network management (PBNM) system may identify one or more policies associated with a network component (e.g., a network device, a device group, a device subgroup, a user, an application, an end-host, etc.) by identifying one or more policies directly associated with the network component, generating a list of one or more groups to which the network component belongs, and identifying one or more policies associated with each of the groups in the generated list. An aggregated data set (e.g., a hash table or a balanced tree) may be used to store network component identity elements, one or more pointers to a deployed policy tree, and one or more pointers to a network configuration tree. Each identity element in the data set identifies a network component and has an associated network configuration tree pointer and one or more associated deployed policy tree pointers.

26 Claims, 6 Drawing Sheets

| Index (401) | Device/Group ID (402) | Deployment Tree Pointer(s) (403) | Configuration Tree Pointer (404) |
|---|---|---|---|
| 0 | DevGrp1 | <node 313> | <node 207> |
| 1 | | | |
| 2 | Rtr1 | <node 315> | <node 213> |
| ⋮ | | | |
| i | SW1 | <node 317><br><node 318> | <node 215> |
| j | SWGrp1 | <node 316> | <node 212> |
| k | LBGrp1 | <node 314> | <node 211> |
| ⋮ | | | |

FIG. 4

IDENTIFYING NETWORK MANAGEMENT POLICIES

BACKGROUND

The present application describes systems and techniques for identifying network management polices, for example, in a Policy-Based Network Management (PBNM) system. PBNM is a technology for actively managing network resources based on policies derived from criteria such as user identity, application type, current traffic conditions, bandwidth requirements, security considerations, time-of-day, cost, machine name, machine location and so on. PBNM seeks to provide comprehensive control over network resources by facilitating the specification, configuration, monitoring, and enforcement of policies related to requests for access to, and reservation of, resources in the network.

A typical PBNM architecture 100, such as shown in FIG. 1, is based on a client-server paradigm in which PBNM-enabled network devices (either virtual or physical) act as policy enforcement points (PEPs) or policy clients 108, which communicate with a policy server 110, acting as a policy decision point (PDP), using a protocol referred to as COPS (Common Open Policy Service). Examples of physical network resources that may serve as PEPs 108 include servers 101, desktops 102, gateways 103, routers 104, local area network (LAN) switches 105 and Network Interface Cards (NICs) 106, firewalls, load balancers and so on. Examples of virtual network resources that may serve as PEPs 108 include multicast channels, virtual LANs (VLANs), monitoring services and accounting services.

In order to create, manage and deploy policies to devices, a policy console 112, a user interface component, may be used. All relevant information about network devices and the policies deployed to, or otherwise associated with, them is stored in the policy database 114 coupled to the policy server 110.

DRAWINGS DESCRIPTIONS

FIG. 4 shows an example of a policy aggregated data set (ADS) table.

Details of one or more embodiments are set forth in the accompanying drawings and the description below. Other features, objects, and advantages will be apparent from the description and drawings, and from the claims.

DETAILED DESCRIPTION

One of the subtasks performed by a policy decision point (PDP) is to make a decision based on an incoming request from a policy client or device. Typically, the first step is to identify all of the policies currently deployed to, or otherwise associated with, that device. As the number of policies deployed becomes large, searching for and identifying a list of deployed policies can consume considerable amounts of time and resources. Accordingly, systems and techniques, as described below, have been developed that may dramatically reduce the amount of time that a policy server takes to determine the list of policies that are to be deployed or which already have been deployed.

Figure 1:
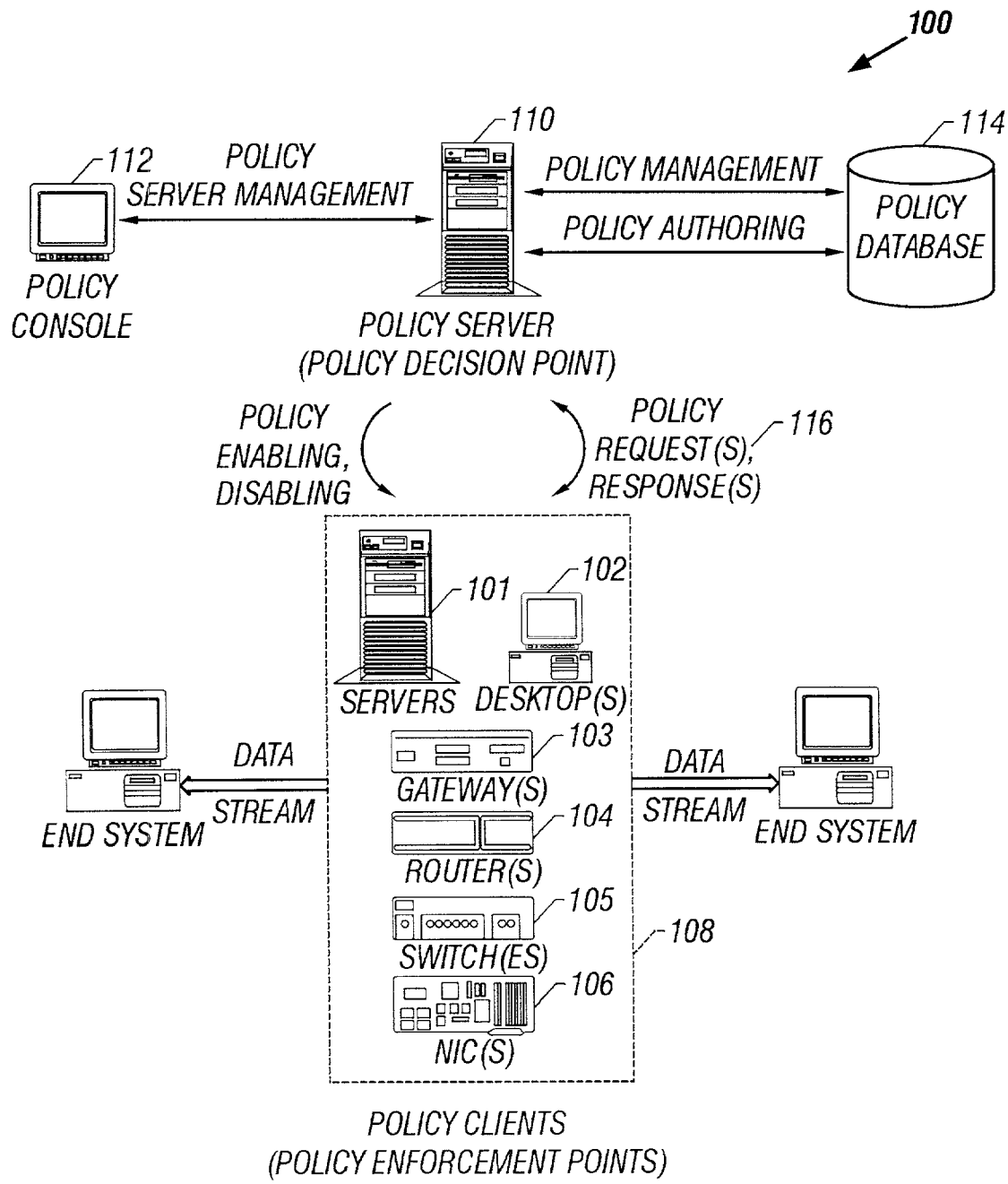
FIG. 1 is a diagram of an example of a conventional PBNM architecture.

Referring to FIG. 1, PEPs 108 that are COPS-enabled (i.e., devices that understand the COPS protocol) may send their respective policy requests 116 to the PDP 110 which returns a decision based on the policies that apply to the network resource in the request. Devices that do not understand COPS are managed by a proxy, for example a NIC 106 installed in a desktop computer. A proxy is a component that translates policies into a format understood by the device and installs them on the device. Devices also may ask the server to make a policy decision given other information specified in a request. For example, such information may include, but is not limited to, usernames, end-host names, application names, or any combination of these. In such cases the server typically must again determine the applicable set of policies that apply for any given request.

Devices also can be grouped together—to form a network device group—based on some common characteristics. By doing so, policies can be associated with a group rather than to individual devices. Devices can be grouped based on device type, physical location, supported capabilities and so on. For example, in a domain, all routers (or switches, load balancers) could belong to one group, all devices in an enterprise's marketing building could be in a separate group, and/or all routers supporting a particular protocol could be in another group. A group can be further broken down into subgroups, for example a group of routers could be split into gateway routers and intranet routers. Likewise, other components can be associated with policies, including usernames, application names, end-host names, and so on. These components can be grouped in the manner similar to that described above to produce groups of users, end-hosts, applications, and so on. As used herein, a "network component" refers to any of a network device (physical or virtual), a user, an application, an end-host, a group of any of the foregoing, or a subgroup of any of the foregoing.

PBNM typically employs tree-based structures to represent all the information in the policy database. A tree allows efficient storage of information in a hierarchical manner. In essence, the policy database 114 is a collection of trees, where each tree can be viewed as a logical collection of a specific type of information. For example, a policy tree stores information about all policies, a configuration tree stores network device information, a deployment tree stores information that determines which policies are deployed to which network devices and so on. When the policy server 110 is initiated, it loads and stores an in-memory copy of the policy database 114. The policy server 110 occasionally traverses different trees to gather information in order to make a decision.

Figure 2:
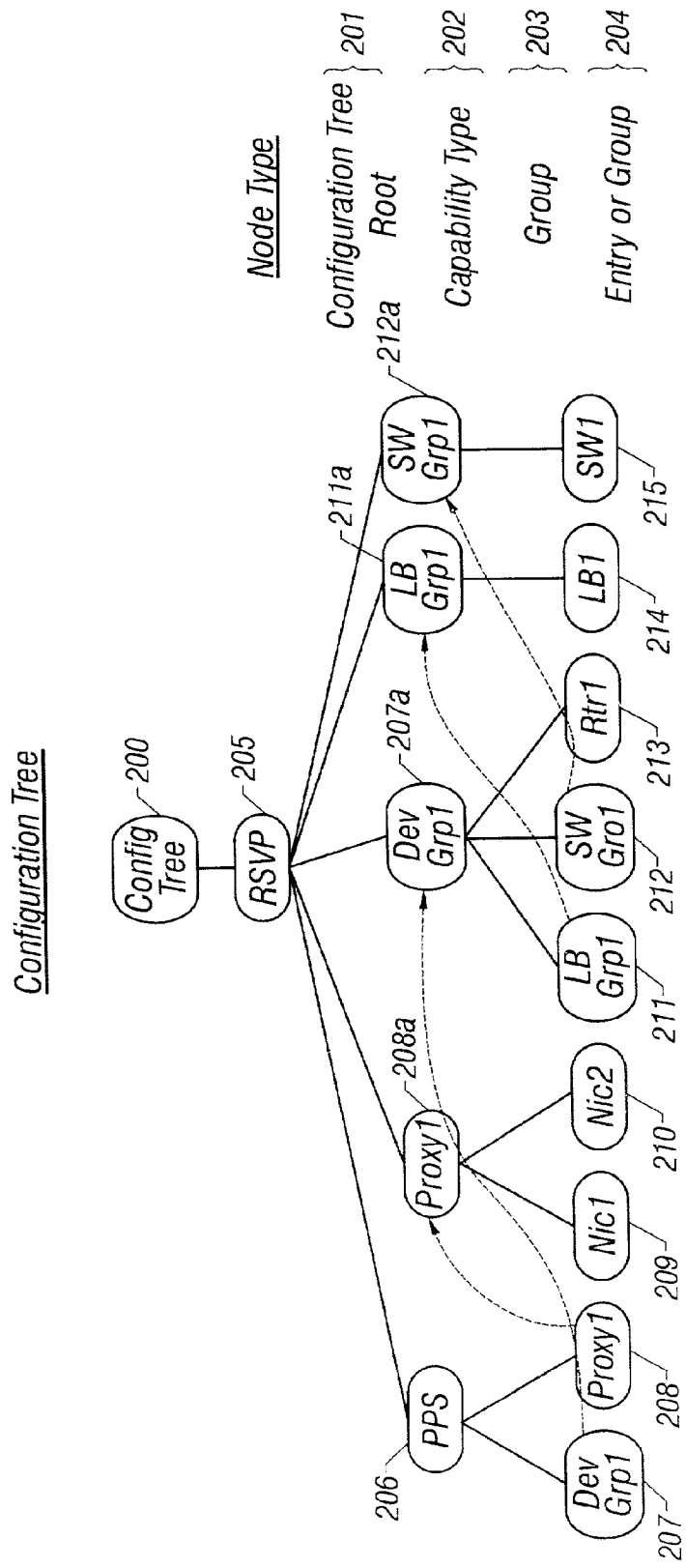
FIG. 2 shows an example of a network configuration tree, an example of a number of components, and groupings of components that can be associated with a policy.

As noted above, a configuration tree shows capabilities supported by network devices and their logical groupings. A configuration tree, which typically includes a status attribute that determines which policies have actually been deployed to a given device, gets updated as and when network devices willing to be managed by the policy server connect to it using the COPS protocol. An example configuration tree 200 as shown in FIG. 2 is formed of four different types of nodes: a configuration tree root node 201, a capability type 202, a group type 203, and an Entry or Group type 204. For the sake of clarity in this example, only a single capability—RSVP (ReSerVation Protocol—a network management protocol used to setup quality of service (QoS) parameters between destination and source hosts), and in particular, RSVP bandwidth—is considered and thus the configuration tree 200 has only a single capability type node 202. A capability signifies a group of services or capabilities that a device supports. In practice, a complete configuration tree typically would be larger and would have several different capability nodes 202, each of which could have multiple leaf nodes connecting thereto.

In the example of FIG. 2, the configuration tree 200 can be interpreted as follows. Node 206, labeled PPS, represents the Primary Policy Server, which manages a proxy named Proxy1 (node 208, 208a) and a group of devices belonging to a group named DevGrp1 (node 207, 207a). Proxy1 manages Nic1 and Nic2 (nodes 209 and 210, respectively). The device group DevGrp1 includes a router Rtr1 (node 213) and two subgroups LBGrp1 (node 211, 211a) and SWGrp1 (node 212, 212a). LBGrp1 is a subgroup of load balancers that includes a single device LB1. SWGrp1 is a subgroup of switches that includes a single switch SW1.

A deployment tree associates policies with the network devices to which they are to be deployed or already deployed. A deployment tree gets created and/or modified when a system administrator targets a policy to a device or detaches a policy already deployed to the device. Of the trees traversed by the policy server in order to generate a list of deployed policies for a particular network device, the policy tree generally is the most frequently traversed.

Figure 3:
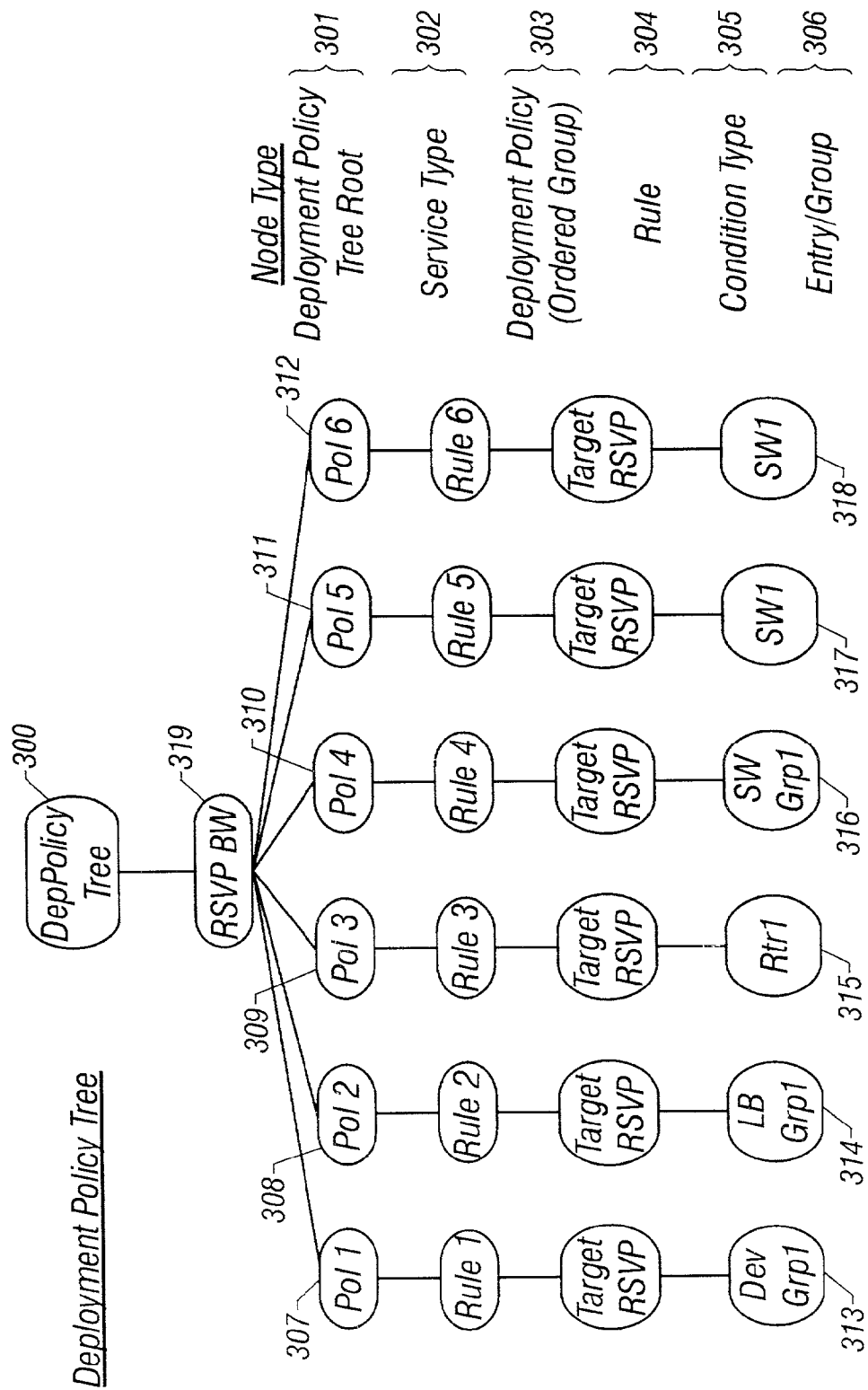
FIG. 3 shows an example of a deployment policy tree.

FIG. 3 shows an example of a deployment policy tree formed of six different node types: a deployment policy tree root node type 301, a service type 302, a deployment policy (ordered group) type 303, a rule type 304, a condition type 305, and an Entry/Group type 306. The service type 302 in this example is limited to a single service—namely, RSVP bandwidth (BW) (node 319). As before, in practice a complete deployment policy tree would include several different types of services 302 branching from the DepPolicy tree node 300 and would be larger and more complex.

Figure 3A:
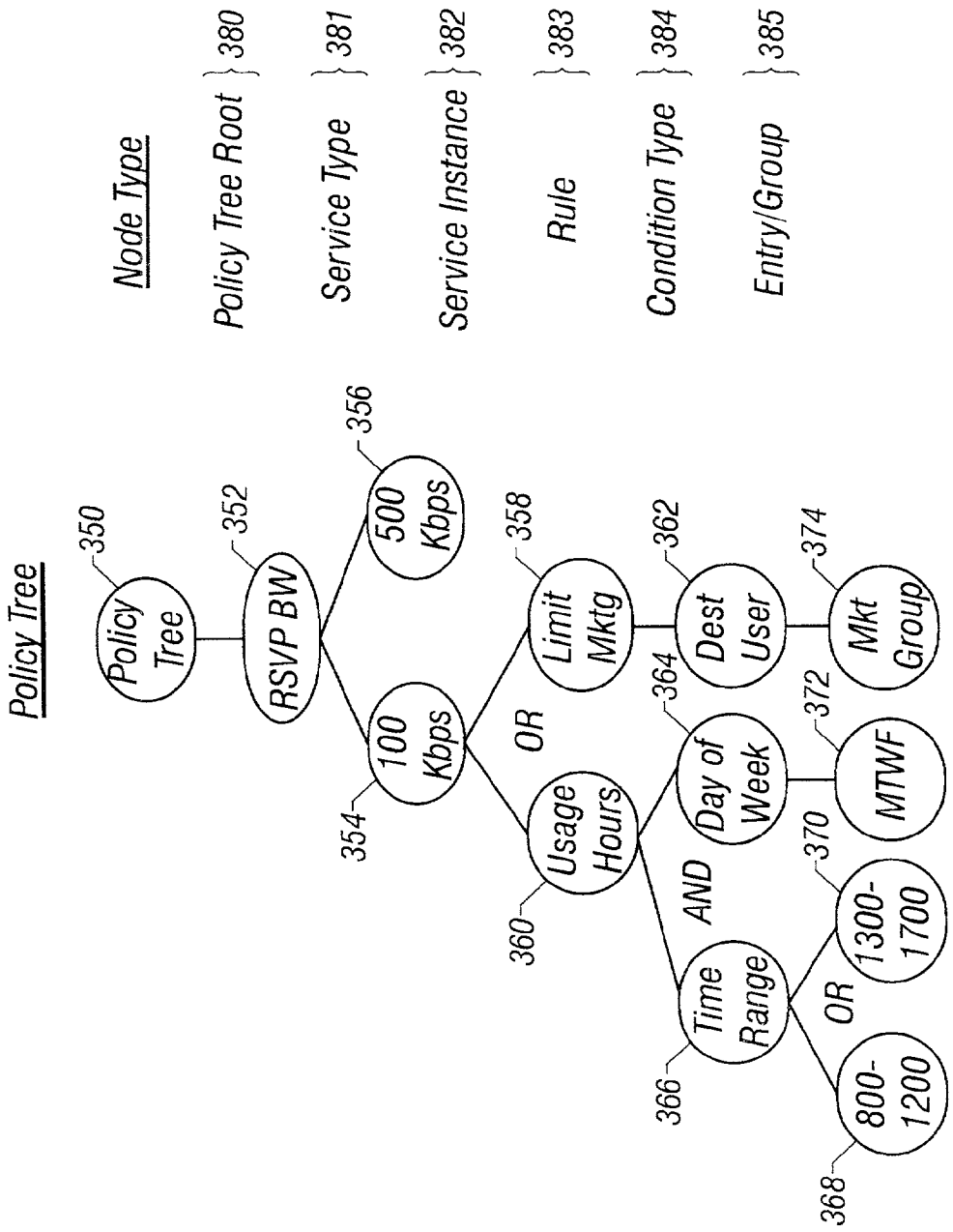
FIG. 3A shows an example of a policy tree that may be used, for example, to associate the components in the configuration tree with policies.

FIG. 3A shows an example of a policy tree 350 for a specific service type, namely RSVP BW. The example policy tree 350 of six different levels 380–385 of node types: policy tree root 380, service type 381, service instance 382, rule 383, condition type 384, and entry/group 385. In general, a policy tree such as shown in FIG. 3A groups policies for a given service type. Policy nodes in a deployment tree, such as shown in FIG. 3, point to the service instance nodes 382 in an associated policy tree.

FIG. 3A shows examples of policies for service type RSVP BW. Such policies may be deployed to all RSVP-capable clients that make bandwidth related requests. Each service type may have multiple Service Instances. For example, the RSVP BW service type in FIG. 3A has two instances, 100 Kbps and 500 Kbps. These instances represent rules that may be used to determine the applicability of that instance. Each policy rule represents one or more policy elements that, together, set conditions for client access or use of the target service instance. Each rule may include one or more conditions which, when logically AND'ed together, provide a Boolean result. Entry/group nodes 385, which comprise the leaves of the policy tree 350, represent attributes of a service instance such as time intervals or duration, an entity's network address, a user ID, a host name, a software module, etc. In the example of FIG. 3A, the Time Range condition 366 has two entries 368, 370, namely 8:00–12:00 hrs and 13:00–1700 hrs.

In the example of FIG. 3A, the rule Usage Hours 360 specifies that no more than 100 Kbps can be used by clients on Mon, Tue, Wed and Fri between the hours of 8:00–12:00 and 13:00–1700. The rule Limit Mktg 358 limits bandwidth usage to 100 Kbps for all users belonging to the marketing group.

Returning to the deployment policy tree 300 in FIG. 3, each of the sixth-level nodes (i.e., nodes of the Entry/Group type 306) represents a network device or a network device group. The third-level nodes 307–312 (i.e., nodes of the Deployment Policy type 303) represent the respective policies deployed to the network devices and device groups in the network configuration. If a policy is deployed to a network device group, it means that that policy applies to all the devices (and device sub-groups) comprising that group. For example, the deployment policy tree 300 reveals that a policy by the name of "Pol4" (node 310) is deployed to SWGrp1 (node 316). Consequently, Pol4 is deployed to every member of SWGrp1, which as can be seen in FIG. 2, includes a single member SW1.

One method of generating a list of associated policies to be deployed, or already deployed, to a network device in a policy based network involves using a search algorithm performed, for example, by one or more software processes executing on a policy server, that exhaustively and repetitively searches through the deployment policy tree and the network configuration tree, one device at a time, to identify all policies currently deployed to a network device or device group of interest.

For example, in order to generate a list of all policies deployed to SW1, the search algorithm starts at the service type node 319 (RSVP BW) and sequentially considers each policy (Pol1–Pol6) by traversing each branch of the tree to reach the corresponding Entry/Group node. In the deployment policy tree of FIG. 3, for example, the algorithm might start with Pol1 (node 307) and thus would first find the group node identity "DevGrp1". Because DevGrp1 does not match the identity of the device under consideration (Sw1), Pol1 is not yet added to the list of SW1's currently deployed policies. However, the algorithm continues on to check whether SW1 is a member of DevGrp1. To do so, the algorithm finds DevGrp1 in the configuration tree (node 207 in FIG. 2) and follows its branches to determine the identity of DevGrp1's members. As can be seen from FIG. 2, DevGrp1 includes two sub-groups (LBGrp1, SWGrp1) and one network device (Rtr1). The algorithm thus continues to determine that the members of the identified sub-groups LBGrp1 and SWGrp1 include LB1 (not the device under consideration) and SW1, which is the device under consideration. Accordingly, Pol1—the policy identified in node 307 in FIG. 3 at which the search commenced—is added to the list of currently deployed policies for SW1. Essentially the same procedure is repeated for each of the other deployment policy nodes 308–312 in FIG. 3, resulting in a final list of deployed policies for SW1 including Pol1, Pol4, Pol5 and Pol6.

An optimized algorithm for identifying policies associated with a network component (whether a user, device, application, etc.) may use a data structure, for example, an Aggregated Data Set (ADS) table, to store deployment policy data and related data, thereby significantly decreasing the lookup latency on the order of $O(\log_b n)$, where $O( )$ is a theoretical measure of the complexity (e.g., latency of execution) of an algorithm, n is the number of nodes in a group tree (such as the configuration tree), and b is greater than or equal to 2. In other words, assuming that b equals two, if the exhaustive search algorithm took 1024 milliseconds to complete, then the optimized algorithm may take about $\log_2$ of 1024 (i.e., 10) milliseconds.

FIG. 4 shows an example of a data structure—an ADS table 400—that can be used to implement an optimized process to search for and identify a set of one or more policies deployed to a network component of interest. Each entry in the table identifies a particular network component and contains pointers to the deployment policy tree that can be used to identify the policies deployed to that network component. Each entry in the table also maintains a pointer to the corresponding configuration tree entry. When a node is added to the configuration tree, a corresponding entry is made to the ADS table. Whenever a policy gets deployed to, or withdrawn from, a network component, corresponding changes are made to the ADS table.

As shown in FIG. 4, the ADS table 400 can be implemented as a two-dimensional data structure formed of columns (or "fields") and rows (or "entries"). As shown, the ADS table 400 has four fields—Index 401, Device/Group Identity 402, Deployment Tree Pointer(s) 403 and Configuration Tree Pointer 404—and as many entries 405 as needed to represent each of the network devices and groups in the current network configuration. Each different network component has a corresponding entry 405 in the table 400. Other table arrangements may be used depending on the preferences of the system designer, administrator and/or user.

The Index field 401 contains an index value that can be used by the optimized search algorithm to access the appropriate ADS table entry using a hash function. Construction of a hash key that can be used for the ADS table is discussed below with regard to FIG. 5. In the example shown in FIG. 4, it is assumed for the sake of description that DevGrp1 has an index value of 0, Rtr1 has an index value of 2, SW1 has an index value of i, SWGrp1 has an index value of j, and LBGrp1 has an index value of k (where i, j, k represent integer values).

The Device/Group ID field 402 includes the identity of the network component for the entry under consideration (e.g., DevGrp1, Rtr1, SW1, etc.).

The Deployment Tree Pointer(s) field 403 includes a list of one or more pointers to the deployment policy tree that can be used by the optimized search algorithm to identify the policies that are directly deployed to, or otherwise associated with, the corresponding network component. Alternatively, instead of pointers to Entry/Group nodes in deployment tree, the ADS table could include names or other identifiers of policies themselves or pointers directly to policies.

A policy is considered to be "directly" deployed to, or associated with, a network component if the component is a leaf of the policy's corresponding node in the deployment policy tree. On the other hand, a policy is considered to be "indirectly" deployed to, or associated with, a network component if the policy is subject to deployment to a group containing the network component under consideration. For example, as shown in FIG. 3, policy Pol2 (node 308) is deployed directly to LBGrp1 (node 314) because node 314 is a leaf of node 308, whereas policy Pol1 (node 307) is deployed indirectly to LBGrp1 (node 314) because LBGrp1 is a member of group DevGrp1 (node 313), which is a leaf node of policy Pol1 (node 307).

More particularly, the Deployment Tree Pointer(s) field 403 includes one or more pointers to the corresponding Entry/Group nodes in the deployment tree. The optimized search algorithm can use these pointers to jump to the appropriate location in the deployment policy tree and, by traversing three levels up the tree, to find the policies directly deployed to the network component in question. For example, the entry for SW1 in FIG. 4 (index=i) lists two pointers in the Deployment Tree Pointer(s) field 403—one to node 317 and another to node 318 (both shown in FIG. 3). The optimized search algorithm can use these pointers to jump to nodes 317 and 318 in the deployment policy tree (FIG. 3), and traverse up three nodes (to the Deployment Policy level 303) to discover that policies Pol5 (node 311) and Pol6 (node 312) are directly deployed to device SW1.

The Configuration Tree Pointer field 404 includes a pointer to the corresponding configuration tree node for the network component identified in the corresponding Device/Group ID field 402. The optimized search algorithm can use the pointer in field 404 to quickly identify the device groups, if any, to which the network component under consideration belongs, by traversing up the configuration tree. For example, the ADS table entry for Rtr1 (index=2) includes a pointer to node 213 in the configuration tree (FIG. 2). The optimized search algorithm can use this pointer to discover that Rtr1 is a member of DevGrp1 by traversing up from node 213.

Figure 5:
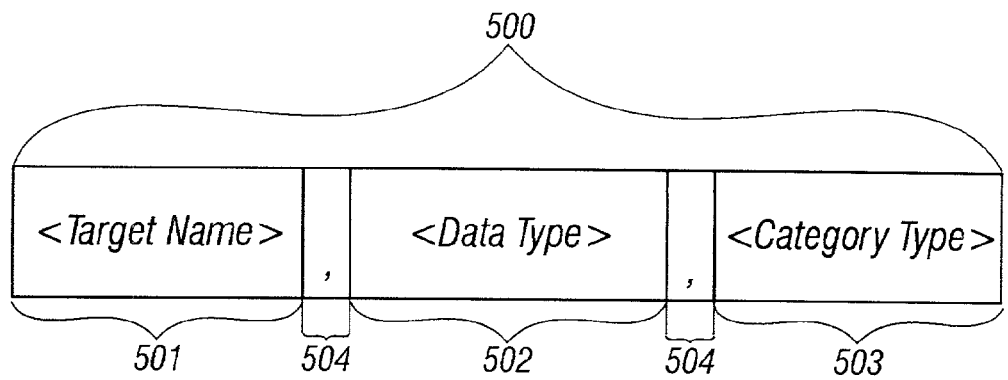
FIG. 5 is a data diagram showing a format of a hash key for indexing the ADS table of FIG. 4.

FIG. 5 is a data diagram showing a construction of a hash key that can be used with the ADS table such as in FIG. 4. As shown in FIG. 5, the hash key 500 is formed of three different fields 501–503 separated by commas 504: a target name 501, which is the identity (ID) of a network component (device, group or subgroup), a data type 502, which indicates how the target name 501 is to be interpreted, and a category type 503, which indicates the service type, corresponding to the second-level node in the deployment policy tree of FIG. 3.

The target name 501 can represent the network component ID either as a string of alphanumeric characters or as a number. Device groups are identified by a string corresponding to the group name (e.g., "DevGrp1").

The data type 502 specifies whether the data in the target name field 501 should be interpreted as a string, as an Internet Protocol (IP) address (either IP version 4 (IPv4) or IP version 6 (IPv6)), or as a Media Access Control (MAC) address if the device is a data link layer (layer 2) device, which does not support IP addressing. A data type value of 200 indicates that the device ID is stored as a string, whereas a data type value of 201 indicates that device ID is stored as an IPv4 address. Alternatively, or in addition, the character "G" could be used as a data type value to indicate that the device ID stored in the target name field 501 is a string containing the name of a device group. In that case, the hash key for a device group entry would take the form: <target name>,G,<Category Type>.

As an example, if a network device has an IP address of 1.2.3.4, the target name 501 could represent the device ID either as a string "1.2.3.4" or as the number 04030201 (the IP v.4 representation of an IP address). In this example, either of two different hash keys could be constructed, each of which would hash to the same location in the ADS table:

1.2.3.4,200,1

04030201,201,1

Note that both hash keys use the same value ("1") for the category type 503, which, for example, could correspond to the RSVP service example used in the deployment policy tree of FIG. 3.

Figure 6:
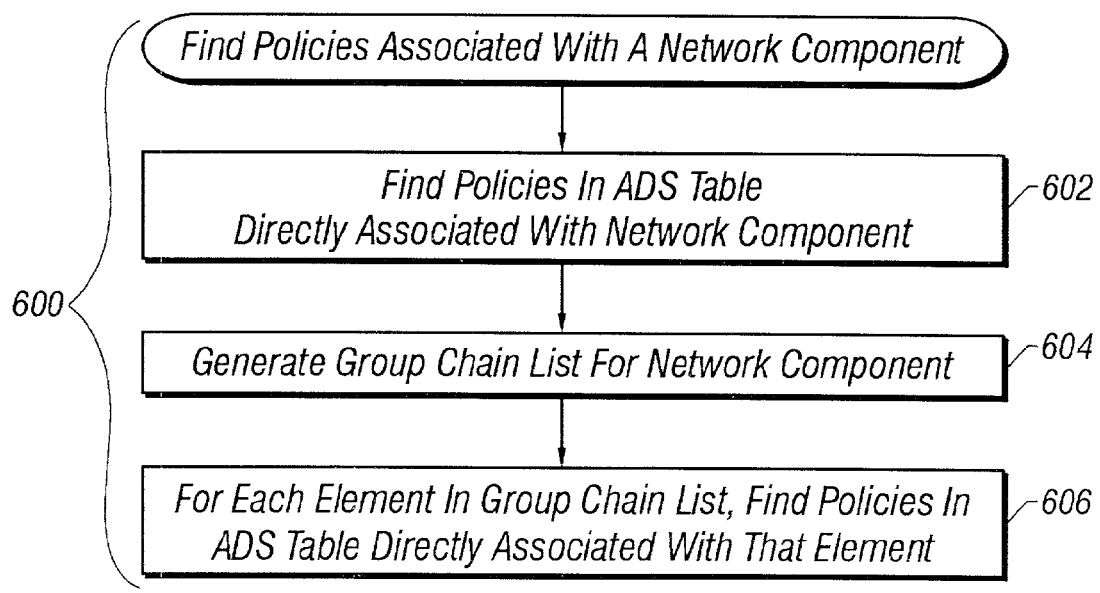
FIG. 6 is a flowchart of a process for finding a set of policies that are to be deployed, or already deployed, to an associated network device.

FIG. 6 is a flowchart of an optimized search process 600 for finding policies associated with (e.g., deployed to, available but not deployed, scheduled, etc.) a particular network component. In general, the process 600 may be applied or used more generally to identify policies associated with any specified subject such as a user, a group of users, an application, a group of applications, a computer or other machine or a group thereof, a time period, a time constraint or other time conditions, and so on. The process 600, which, for example, may be performed by one or more software processes executing at the policy server, typically would be executed on a network component specific basis—that is, the process 600 would be performed separately for each network component for which a list of policies is to be identified.

First, the process 600 finds the policy or policies, if any, in the ADS table that are directly associated with the network component under consideration (602). To do so, the process 600 uses the hash key for the network component to find its corresponding entry in the ADS table and retrieves the pointer or pointers in the Deployment Tree Pointer(s) field 403 (see FIG. 4) of the ADS table. For example, if the device under consideration is SW1, the process 600 would use SW1's hash key to find SW1's entry in the ADS table (index=i) and then would retrieve the two pointers <node 317> and <node 318> from the Deployment Tree Pointer(s) field of SW1's ADS table entry. The process 600 then can use these two pointers, for example, in sequential fashion, as starting points for traversing up three levels in the Deployment Policy Tree 300 (see FIG. 3) to determine that the policies Pol5 (node 311) and Pol6 (node 312) are directly associated with SW1.

Next, the process 600 generates a group chain list for the network component under consideration (604). To do so, the process 600 retrieves the pointer in the Configuration Tree Pointer field 404 (see FIG. 4) from the ADS table entry for the network component in question and uses this pointer as a starting location in the Configuration Tree 200 (FIG. 2) to identify the device groups, if any, to which the network component under consideration belongs. Continuing the above example in which the process 600 is searching for all polices associated with SW1, the process 600 retrieves the pointer <node 215> from the Configuration Tree Pointer field of SW1's ADS table entry and uses the retrieved pointer to identify SW1's parent node (node 212*a*), which corresponds to device group SWGrp1. Accordingly, the process 600 has learned at this point that SW1 is a member of group SWGrp1. The process 600 then looks up SWGrp1's entry in the ADS table (index=j), retrieves SWGrp1's configuration tree pointer—namely, <node 212>—and uses the retrieved pointer to identify SWGrp1's parent node (node 207*a*), which corresponds to DevGrp1, meaning that SWGrp1, and by definition SW1, are members of device group DevGrp1. This searching and building of the group chain list continues recursively until the process 600 encounters a node in the configuration tree that is not a device group. In the current example, the process 600 stopped searching and building the group chain list when the Primary Policy Server (PPS)(node 206) was encountered. As a result, the group chain list for SW1 includes two elements: SWGrp1 and DevGrp1.

Next, for each element in the group chain list, the process 600 determines the policy or policies, if any, in the ADS table that are directly associated with that element (606). To do so, the process 600 uses the hash key for the element to find its corresponding entry in the ADS table, retrieves the pointer or pointers in the Deployment Tree Pointer(s) field 403 (see FIG. 4) of the ADS table, and uses the retrieved pointers to traverse three levels up the Deployment Policy Tree to identify the policies directly associated with the element under consideration. In the current example, the process 600 would retrieve the deployment tree pointer <node 316> from the ADS table entry for the first element in SW1's group chain list—SWGrp1 (index=j)—traverse up three levels in the Deployment Policy Tree 300 (FIG. 3) to discover that policy Pol4 (node 310) is directly associated with SWGrp1 (and thus indirectly associated with SW1), and then add Pol4 to SW1's policy list (which at this point includes Pol6, Pol5, and Pol4). The process 600 then takes the next element from SW1's group chain list (DevGrp1), retrieves the deployment tree pointer <node 313> from the ADS table entry for DevGrp1 (index=0), traverses up three levels in the Deployment Policy Tree 300 (FIG. 3) to discover that policy Pol1 (node 307) is directly associated with DevGrp1 (and thus indirectly associated with SW1), and then adds Pol1 to SW1's policy list, which at conclusion of the process includes Pol6, Pol5, Pol4, and Pol1.

Alternative embodiments of the optimized search algorithm may be used advantageously. For example, a red-black tree, or potentially other types of balanced trees such as AVL-trees or B-trees, could be used instead of an ADS table. Using an ADS tree may be advantageous because operations such as searching a data set can be performed in $O(\log_2 n)$ time if the data is stored in a balanced tree. A red-black tree is a balanced, binary search tree with one extra attribute—the color, which is either red or black—for each node in the tree. A red-black tree has the following properties: (1) every node is either red or black; (2) every terminal node of the tree is black; (3) if a node is red, then both of its children are black; and (4) every simple path from a node to a descendant leaf contains the same number of black nodes.

The optimized search algorithm described here may provide several advantages. For example, the optimized search algorithm may identify policies deployed to, or associated with, network components (such as network devices, users, end-hosts, applications, etc.) with dramatically reduced latency. More particularly, in the case of an optimized search of an ADS table, the search is of the order O (Group Depth). In the case of an optimized search of an ADS tree, the search is of the order $O (\text{Group Depth}*\log_2 n)$. In contrast, in the exhaustive search algorithm, because all leaf nodes are compared against the node name, the deployment policy tree search is of the order O (Leaf node depth)*(number of leaf nodes in deployment tree)*(Number of Group level nodes in configuration tree *(number of leaf nodes in configuration tree).

Various implementations of the systems and techniques described here may be realized in digital electronic circuitry, integrated circuitry, specially designed ASICs (application specific integrated circuits) or in computer hardware, firmware, software, or combinations thereof.

Other embodiments may be within the scope of the following claims.

What is claimed is:

1. A method comprising providing a capability to perform operations on a computer system, the operations comprising:
    searching an entry associated with a network component in an aggregated data set to identify one or more pointers to a deployment policy tree and a pointer to a configuration tree, the deployment policy tree hierarchically associating policies with a plurality of network components including the network component, the configuration tree hierarchically defining a plurality of deployed network components including the network components;
    based on the identified one or more pointers to the deployment policy tree, searching the deployment policy tree to identify one or more policies directly associated with the network component and to identify one or more policies directly associated with the group;

based on the identified pointer to the network configuration tree, searching the configuration tree to identify a parent node corresponding to a group to which the network component belongs to generate a list of one or more groups to which the network component belongs.

2. The method of claim 1 in which the network component comprises one or more of the following: a network device, a device group, a device subgroup, a user, a group of users, an application, a group of applications, an end-host, a group of end-hosts, and one or more time conditions.

3. The method of claim 2 in which at least one of the identified policies associated with the network component is currently deployed.

4. The method of claim 2 in which at least one of the identified policies associated with the network component is currently undeployed.

5. The method of claim 1 further comprising recursively searching the aggregated data set and the configuration tree until a non-group node is encountered in the configuration tree.

6. The method of claim 5 in which the recursive searching generates a group chain list.

7. The method of claim 1 in which one or more of the operations is performed at least in part using the aggregated data set.

8. The method of claim 1 in which the aggregated data set comprises a plurality of entries, each entry corresponding to a network component and including a network component identifier, one or more pointers to a deployment policy tree, and a pointer to a network configuration tree.

9. The method of claim 1 in which providing a capability to perform operations on a computer system comprises providing at a network management policy decision point a policy based network management software application capable of performing the operations.

10. An article comprising:
a storage medium having a plurality of machine readable instructions, wherein execution of the instructions causes a machine to perform operations comprising:
search an entry associated with a network component in an aggregated data set to identify one or more pointers to a deployment policy tree and a pointer to a configuration tree, the deployment policy tree hierarchically associating policies with a plurality of network components including the network component, the configuration tree hierarchically defining a plurality of deployed network components including the network components;
based on the identified one or more pointers to the deployment policy tree, search the deployment policy tree to identify one or more policies directly associated with the network component and to identify one or more policies directly associated with the group; and
based on the identified pointer to the network configuration tree, search the configuration tree to identify a parent node corresponding to a group to which the network component belongs to generate a list of one or more groups to which the network component belongs.

11. The article of claim 10 in which the network component comprises one or more of the following: a network device, a device group, a device subgroup, a user, a group of users, an application, a group of applications, an end-host, a group of end-hosts, and one or more time conditions.

12. The article of claim 10 further comprising instructions to recursively search the aggregated data set and the configuration tree until a non-group node is encountered in the configuration tree.

13. The article of claim 12 in which the recursive searching generates a group chain list.

14. The article of claim 10 in which one or more of the operations is performed at least in part using the aggregated data set.

15. The article of claim 10 in which the aggregated data set comprises a hash table or a red-black tree.

16. The article of claim 10 in which the aggregated data set comprises a plurality of entries, each entry corresponding to a network component and including a network component identifier, one or more pointers to a deployment policy tree, and a pointer to a network configuration tree.

17. A policy based network management (PBNM) system comprising:
a network configuration tree configured to store a hierarchical tree representation of a network configuration, the tree representation being formed of a plurality of nodes, each node corresponding to a network component;
a deployed policy tree configured to store a hierarchical tree representation of policies associated with network components;
an aggregated data set configured to store a plurality of data elements including one or more identity elements, one or more pointers to the deployed policy tree, and one or more pointers to the network configuration tree, each identity element identifying a network component and having an associated network configuration tree pointer and one or more associated deployed policy tree pointers; and
one or more software components configured to identify one or more policies associated with a network component; generate a list of one or more groups to which the network component belongs; and identify one or more policies associated with each of the groups in the generated list.

18. The system of claim 17 in which the network component comprises one or more of the following: a network device, a device group, a device subgroup, a user, a group of users, an application, a group of applications, an end-host, a group of end-hosts, and one or more time conditions.

19. The system of claim 17 in which the one or more software components configured to identify one or more policies associated with the network component are configured to perform the following:
search an entry associated with the network component in the aggregated data see to identify the network component's one or more associated deployed policy tree pointers; and
based on the identified one or more deployed policy tree pointers, search the deployment policy tree to identity one or more policies directly associated with the network component.

20. The system of claim 17 in which the one or more software components configured to generate the list of one or more groups to which the network component belongs are configured to perform the following:
search an entry associated with the network component in the aggregated data set to identify the network component's associated network configuration tree pointer; and
based on the identified network configuration tree pointer, search the network configuration tree to identify a parent node corresponding to a group to which the network component belongs.

21. The system of claim 20 in which the one or more software components recursively search the aggregated data set and the network configuration tree until a non-group node is encountered in the configuration tree.

22. The system of claim 17 in which the one or more software components configured to identify one or more policies associated with each of the groups in the generated list are configured to perform the following for each group in the list:
   search an entry associated with the group in the aggregated data set to identify the group's one or more associated deployed policy tree pointers; and
   based on the identified one or more deployed policy tree pointers, search the deployed policy tree to identify one or more policies directly associated with the group.

23. A method comprising providing a capability to perform operations on a computer system, the operations comprising:
   receiving a request to identify one or more policies associated with a specified subject;
   identifying one or more policies directly associated with the specified subject by:
      searching an entry associated with the specified subject in an aggregated data set to identify one or more first pointers to a deployment policy tree, the deployment policy tree hierarchically associating policies with a plurality of network components including the network component; and
      based on the identified one or more first deployment policy tree pointers, searching the deployment policy tree to identify one or more policies directly associated with the specified subject;
   generating a list of one or more groups to which the specified subject belongs by:
      searching an entry associated with the specified subject in the aggregated data set to identify a pointer to a configuration tree, the configuration tree hierarchically defining a plurality of deployed network components including the network components; and
      based on the identified configuration tree pointer, searching the configuration tree to identify a parent node corresponding to a group to which the specified subject belongs; and
   identifying one or more policies associated with each of the groups in the generated list by:
      searching an entry associated with the group in the aggregated data set to identify one or more second pointers to a deployment policy tree; and
      based on the identified one or more second deployment policy tree pointers, searching the deployment policy tree to identify one or more policies directly associated with the group.

24. The method of claim 23 in which the specified subject comprises one or more of the following: a network device, a device group, a device subgroup, a user, a group of users, an application, a group of applications, an end-host, a group of end-hosts, and one or more time conditions.

25. The method of claim 23 further comprising recursively searching the aggregated data set and the configuration tree until a non-group node is encountered in the configuration tree.

26. The method of claim 23 in which providing a capability to perform operations on a computer system comprises providing at a network management policy decision point a policy based network management software application capable of performing the operations.

* * * * *